United States Patent
Joshi et al.

(10) Patent No.: US 7,686,611 B2
(45) Date of Patent: Mar. 30, 2010

(54) FLAME STRAIGHTENING IN A FURNACE

(75) Inventors: Mahendra Ladharam Joshi, Allentown, PA (US); Xianming Jimmy Li, Orefield, PA (US); William Robert Licht, Allentown, PA (US); Aleksandar Georgi Slavejkov, Allentown, PA (US); Stephen Paul DiMartino, Sr., Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1182 days.

(21) Appl. No.: 11/266,560

(22) Filed: Nov. 3, 2005

(65) Prior Publication Data
US 2007/0099141 A1    May 3, 2007

(51) Int. Cl.
F23C 5/00    (2006.01)
(52) U.S. Cl. .............................. 431/8; 431/354; 431/12; 431/181
(58) Field of Classification Search .................. 431/8, 431/10, 12, 181, 187, 284, 350, 351, 354
See application file for complete search history.

(56) References Cited

U.S. PATENT DOCUMENTS

| | | | |
|---|---|---|---|
| 5,546,874 A | 8/1996 | Breen et al. | |
| 5,795,148 A | 8/1998 | DiMartino, Sr. et al. | |
| 6,237,369 B1 | 5/2001 | LeBlanc et al. | |
| 6,659,762 B2 * | 12/2003 | Borders et al. | 431/8 |
| 6,773,256 B2 | 8/2004 | Joshi et al. | |
| 6,866,503 B2 | 3/2005 | Ladharam | |

FOREIGN PATENT DOCUMENTS

EP    0126948 A1    12/1984

OTHER PUBLICATIONS

Cotton, W., "Fluegas Flow Patterns in Top-Fired Steam Reforming Furnaces", Johnson Matthey, 2003.
Chung, I-Ping, et al., "Solving the Low Emissions Dilemma", Hydrocarbon Engineering, Aug. 2005, pp. 77-80.

* cited by examiner

*Primary Examiner*—Alfred Basichas
(74) *Attorney, Agent, or Firm*—Bryan C. Hoke, Jr.

(57) ABSTRACT

The present invention relates to a method and furnace for generating straightened flames in a steam methane reformer or ethylene cracking furnace where fuel-staged burners are used. Fuel staging may be used for reducing NOx emissions. Criteria for generating straightened flames are provided. These criteria relate to oxidant conduit geometry and furnace geometry. Techniques for modifying the furnace and/or burners to achieve these criteria are also provided.

20 Claims, 8 Drawing Sheets

FIG. 1

FIG. 2
Transverse View

FIG. 3

Transverse View

FIG. 5
Plan View C-C

FIG. 6

Plan View B-B

FLAME STRAIGHTENING IN A FURNACE

BACKGROUND OF THE INVENTION

The present invention relates to a method and furnace for generating straightened flames in a furnace, and in particular to a method and furnace for generating straightened flames in down-fired and up-fired furnaces having multiple rows of reaction chambers (e.g., process tubes) and multiple rows of low-NOx burners.

Large down-fired and up-fired multi-row furnaces (e.g., reformer furnaces and ethylene cracking furnaces) have complex furnace gas flow patterns. Undesirable gas flow patterns can deflect flames and cause localized overheating of process tubes thereby affecting the performance of such furnaces.

Figure 1:
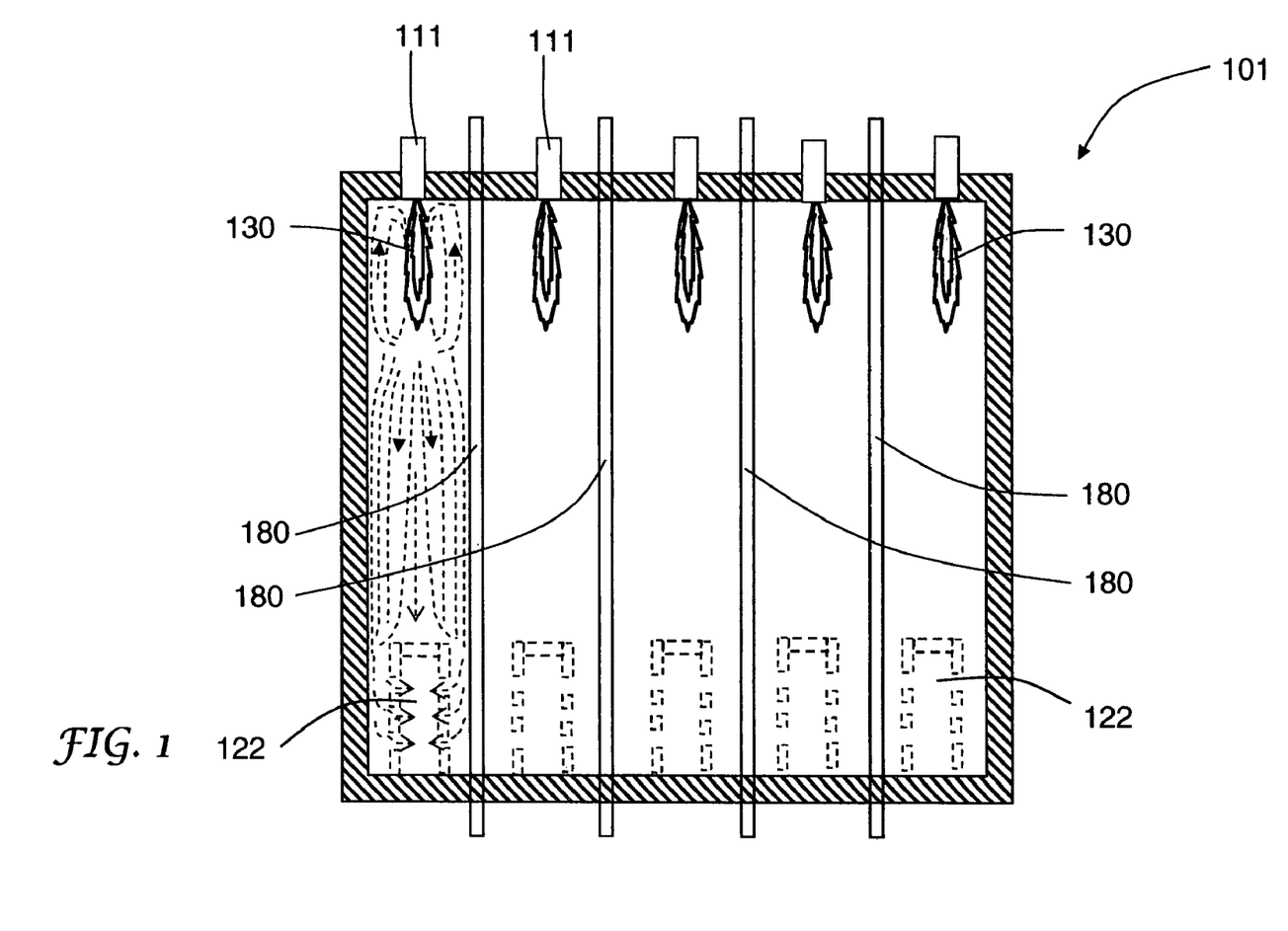
FIG. 1 is a schematic diagram illustrating a transverse view of a furnace with narrow flames firing downward.

A conventional steam methane reformer furnace 101 with a down-firing configuration is shown in FIG. 1. A feed gas (steam+natural gas) is supplied at the top of process tubes 180, which are filled with reforming catalyst. The feed gas is reformed in the catalyst-filled process tubes 180 to form syngas (primarily $H_2$, CO, $CH_4$, $H_2O$, and $CO_2$), which is removed near the bottom of the process tubes 180. The burners 111 generate flames 130 to provide the necessary heat for the endothermic reforming reactions. The removed syngas is then refined or purified further, for example in a pressure swing adsorber (PSA), to produce hydrogen product. The remaining gases may be sent back to the burners 111 for use as a fuel.

In FIG. 1, multiple burners 111 are illustrated with a representative furnace gas flow pattern (on the far left). The flame jet entrains furnace gases resulting in a recirculation loop in the region of the flame 130. Below the flame, furnace gases flow downward, resembling plug flow, and finally flow out through the side inlets of the refractory flue tunnels 122.

In many down-fired multi-row furnaces having conventional narrow flames, the furnace geometry allows sufficient flow area around the flame and may create a recirculation zone in the upper section of the furnace that facilitates straight flames 130, as shown in FIG. 1.

Figure 2:
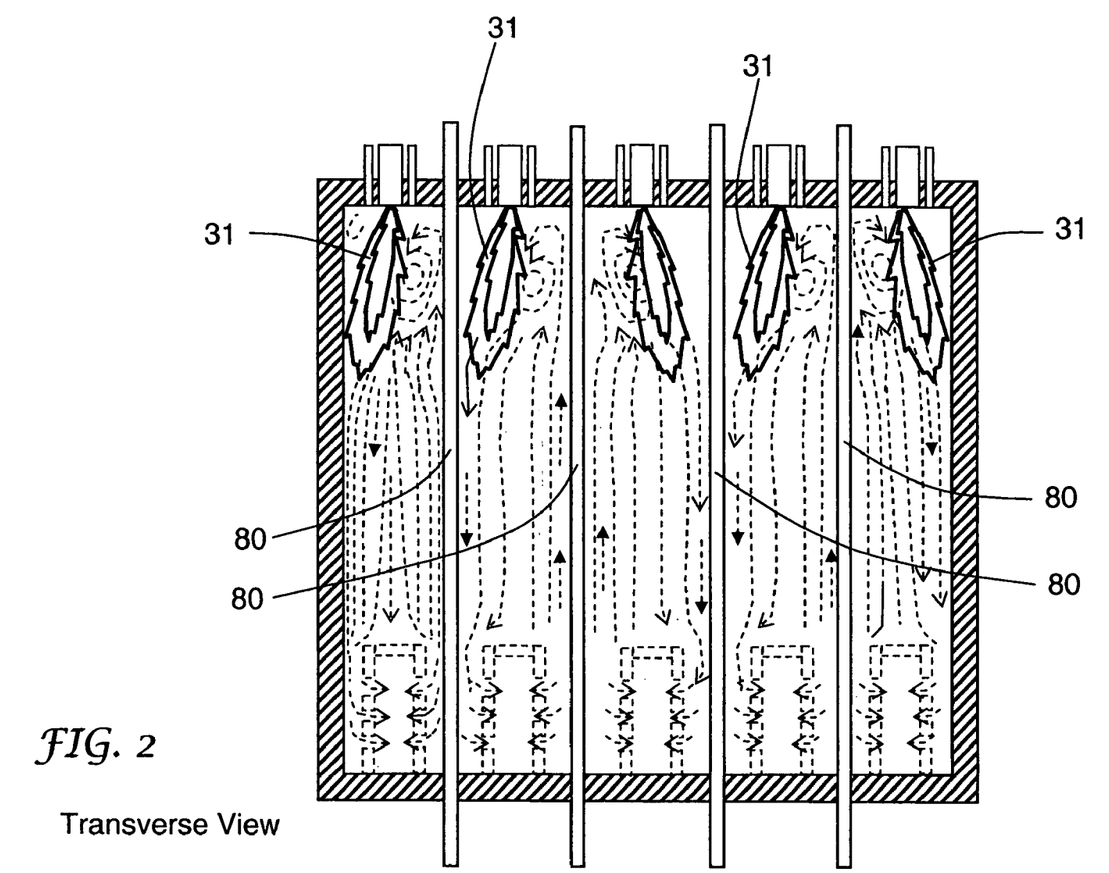
FIG. 2 is a schematic diagram illustrating a transverse view of a furnace with deflected broad flames firing downward.

In the course of implementing new low NOx burner technology in a furnace with an aspect ratio greater than 0.8, the inventors found that substitution of low NOx burners for the conventional burners sometimes produced deflected flames that resulted in the problem of uneven heating of the reaction chambers i.e. process tubes. As depicted in FIG. 2, the new low NOx burners produced broader flames 31 which were deflected or tilted towards some of the reaction chambers 80. The flame bending and impingement on reaction chambers causes localized heating of reaction chamber walls and process gas temperature variations from row-to-row (i.e., "hot" reaction chambers in some rows, and "cooler" reaction chambers in other rows). This resulted in overheating of some reaction chamber walls, non-uniformity in wall temperatures, large deviations in process gas temperatures from one process header to another, poor radiant efficiency, and may reduce the life of the furnace and its components.

The inventors attempted some of the common methods to reduce flame deflection i.e. straighten the flames, in large box-type furnaces. These methods include:

Trimming fuel to several burners where flame impingement is occurring: By reducing the firing rate on selected burners, the flame intensity is reduced. Thus, overheating or hot-spot regions may be avoided. However, in many cases, the problem is simply moved from one furnace location and reappears at another furnace location.

Changing out fuel injection nozzles: Several burner nozzles in hot-spot regions (or burner rows) are replaced with nozzles of smaller orifice diameter (lower firing rate).

Altering flame stoichiometry: The fuel flow to hot-spot region burners is reduced but combustion air flow is kept the same. This creates fuel-lean combustion in selected areas of the furnace. Fuel-lean combustion helps in reducing peak flame temperatures and overheating.

Side row burners at lower firing rate: This is used on various large furnaces where side row burners have a firing rate that is 60% to 70% that of to the center row burners. A side row burner is a burner located adjacent a side wall of the furnace. Decreasing the firing rate of the side row burners tends to prevent these flames from bending toward the center of the furnace.

These methods proved unsatisfactory. Further, some of these methods are not permanent solutions but rather temporary fixes which often reduce the performance of the furnace. In a furnace where furnace gas patterns are unstable, any flame stabilization or straightening efforts in one region could lead to undesirable effects in another region. In other words, the problem is simply moved from one region to another. These methods do not eliminate the problem relating to furnace gas interaction with the flames.

It is desired to have a method and a furnace for generating straightened flames using low-NOx burners in a furnace having multiple rows of burners and multiple rows of reaction chambers.

It is desired to have a method and a furnace for generating straightened down-fired or up-fired flames using low-NOx burners in a furnace having multiple rows of burners and multiple rows of reaction chambers.

It is desired to have a method and a furnace for providing uniform process gas temperatures between the multiple rows of reaction chambers, without reaction chamber overheating.

It is desired to have a method and means for reducing the deflection and resulting impingement of flames on reaction chambers in a furnace using low-NOx burners.

It is desired to have a method and a furnace for generating straightened flames in the furnace with low-NOx burners while fully utilizing the furnace combustion space for improved furnace efficiency.

It is desired to have a method and a furnace for generating straightened flames using low-NOx burners in a furnace with an aspect ratio greater than 0.8.

It is desired to have a method and a furnace for generating straightened flames using low-NOx burners in a furnace having multiple rows of burners and multiple rows of reaction chambers wherein any flame deflection is directed toward an adjacent flame rather than toward a reaction chamber.

BRIEF SUMMARY OF THE INVENTION

The present invention relates to a method and furnace for generating straightened flames in a furnace. The method comprises introducing an oxidant into a plurality of oxidant conduits, where each of the plurality of oxidant conduits have an outlet in fluid communication with the furnace interior proximate a first interior end of the furnace. The first interior end of the furnace has a horizontally projected area. The oxidant conduit outlets define a combined horizontally projected turbulent free-jet area at 30% of the average distance from the first interior end of the furnace to a second interior end of the furnace. The second interior end of the furnace is opposite the first interior end.

The method further comprises introducing a fuel into a plurality of fuel conduits, where each of the plurality of fuel conduits have an outlet in fluid communication with the furnace interior proximate the first interior end of the furnace. The plurality of fuel conduits are in spaced relation to the plurality of oxidant conduits.

The method further comprises mixing the fuel and oxidant in the furnace interior and reacting the fuel and oxidant thereby forming a plurality of flame portions.

The method further comprises transferring heat from the plurality of flame portions to a plurality of reaction chambers where the plurality of reaction chambers traverse from the first interior end of the furnace to the second interior end of the furnace. The plurality of reaction chambers have an end portion in spaced relation to the plurality of oxidant conduits and in spaced relation to the plurality of fuel conduits.

The method further comprises reducing the combined horizontally projected turbulent free-jet area at 30% of the average distance from the first interior end of the furnace to the second interior end of the furnace to between 10% and 105%, or between 90% and 105%, or between 90% and 104% of the horizontally projected area of the first interior end.

The present invention also relates to a furnace for generating straightened flames in a furnace. The furnace comprises a first interior end having a horizontally projected area and a second interior end opposite the first interior end.

The furnace further comprises a plurality of oxidant conduits proximate the first interior end where each of the plurality of oxidant conduits have an outlet fluidly communicating with the furnace interior. The plurality of oxidant conduit outlets define a combined horizontally projected turbulent free-jet area at 30% of the average distance from the first interior end to the second interior end. The combined horizontally projected turbulent free-jet area at 30% of the average distance from the first interior end to the second interior end is between 10% and 105%, or between 90% and 105%, or between 90% and 104% of the horizontally projected area of the first interior end.

The furnace further comprises a plurality of fuel conduits proximate the first interior end. Each of the plurality of fuel conduits have an outlet in fluid communication with the furnace interior. The plurality of fuel conduits are in spaced relation to the plurality of oxidant conduits.

The furnace further comprises a plurality of elongated reaction chambers that traverse from the first interior end to the second interior end. The plurality of elongated reaction chambers have an end portion in spaced relation to the plurality of oxidant conduits and in spaced relation to the plurality of fuel conduits.

In an embodiment of the invention, the furnace may optionally comprise a means for reducing the combined horizontally projected free jet area at 30% of the average distance from the first interior end to the second interior end.

DETAILED DESCRIPTION OF THE INVENTION

Figure 3:
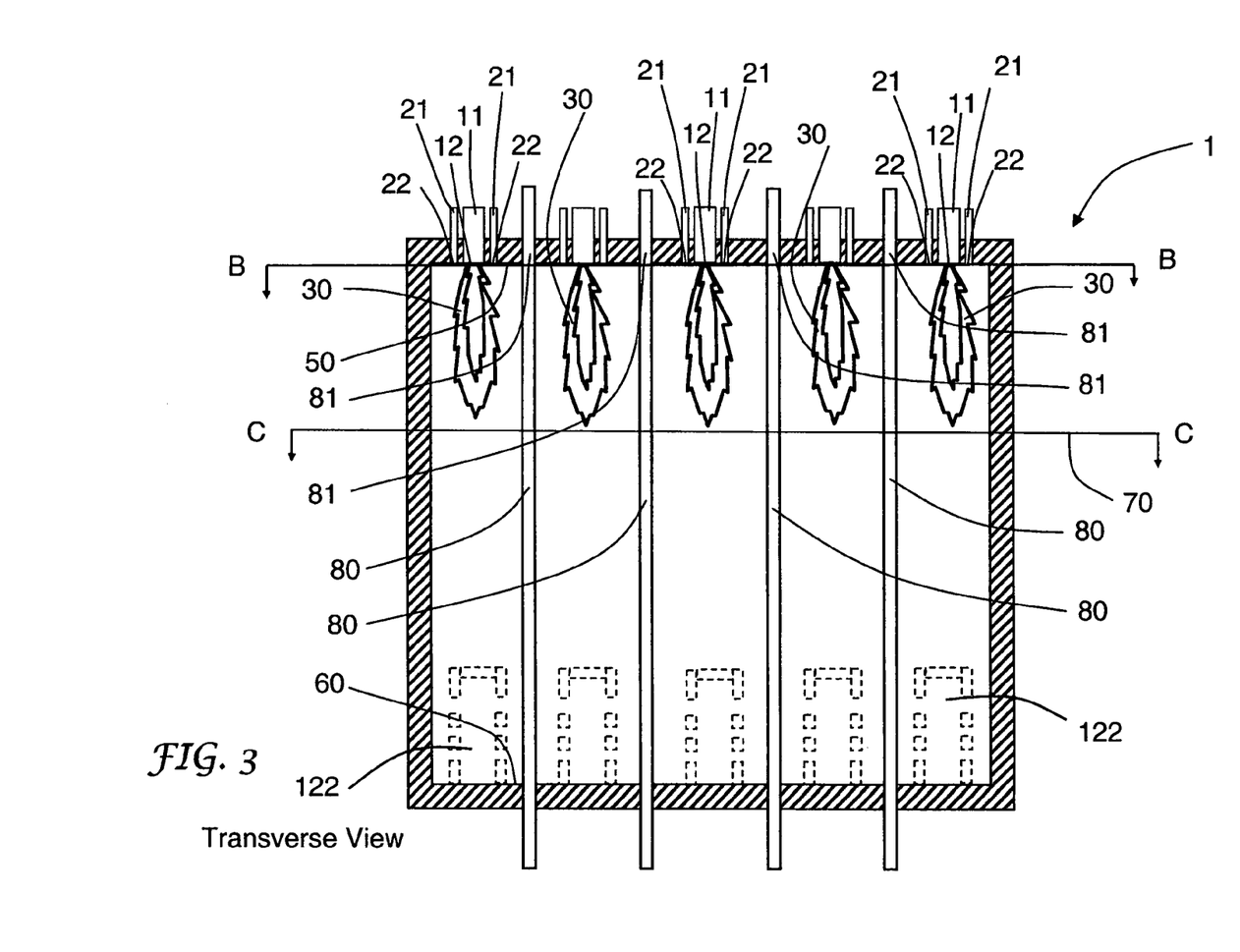
FIG. 3 is a schematic diagram illustrating a transverse view of a furnace with straightened broad flames firing downward.

In an embodiment of the invention, the current invention relates to a method for generating straightened flames in a furnace. Referring to FIG. 3, illustrating a transverse view through furnace 1, the inventive method comprises introducing an oxidant into a plurality of oxidant conduits 11. The oxidant comprises oxygen and may additionally comprise fuel and/or products of combustion. The oxidant may be air. The oxidant may comprise at least 10% by volume oxygen. The oxidant may be formed from precombustion of a fuel with air in a precombustor and introduced through the oxidant conduit. The oxidant may be at ambient temperature or may be heated to a temperature higher than ambient temperature.

Oxidant conduits 11 have outlets 12 fluidly communicating with the interior of the furnace 1, wherein the outlets 12 are proximate interior end 50 of furnace 1. The oxidant outlets 12 may be flush with the interior end 50. As shown in FIG. 3, furnace 1 also has interior end 60 which is opposite interior end 50. An interior end is characterized by the inner surface of the furnace wall. Oxidant conduits 11 may have like geometry or differing geometries. Oxidant outlets 12 may have like cross-sectional areas or differing cross-sectional areas.

As illustrated by example in FIG. 3, interior end 50 for a down-fired furnace is the roof or upper end of the furnace and interior end 60 is the floor or lower end of the furnace. Although shown as a planar surface, interior end 50 may be slanted or arched.

In the embodiment illustrated in FIG. 3, the oxidant is introduced into the furnace substantially vertically downward. For the purposes of this disclosure, substantially vertically downward means within 10 degrees of vertical.

Figure 4:
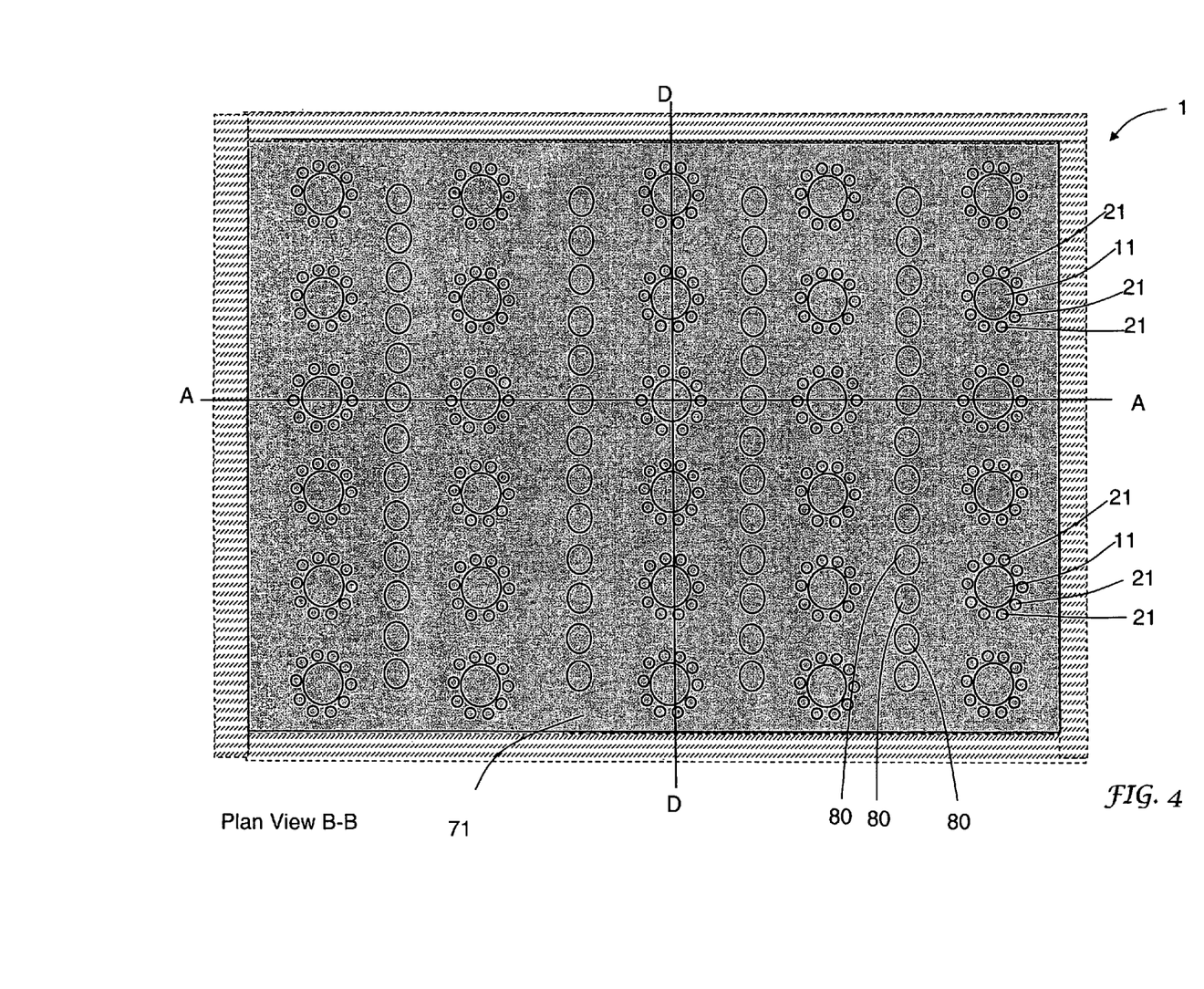
FIG. 4 is a schematic diagram illustrating a plan view of a furnace.

As illustrated in the plan view of furnace 1 in FIG. 4, interior end 50 has a horizontally projected area 71, represented by the rectangular shaded area. A horizontally projected area is the area projected onto a horizontal plane in a direction normal to the horizontal plane. In case the interior end 50 is not a planar surface, for example a slanted or arched surface, the surface may also be projected onto a horizontal plane to give a horizontally projected area. Typically, an industrial scale reformer may have a horizontally projected area anywhere between 46.5 m$^2$ (500 ft$^2$) and 464.5 m$^2$ (5000 ft$^2$).

Figure 5:
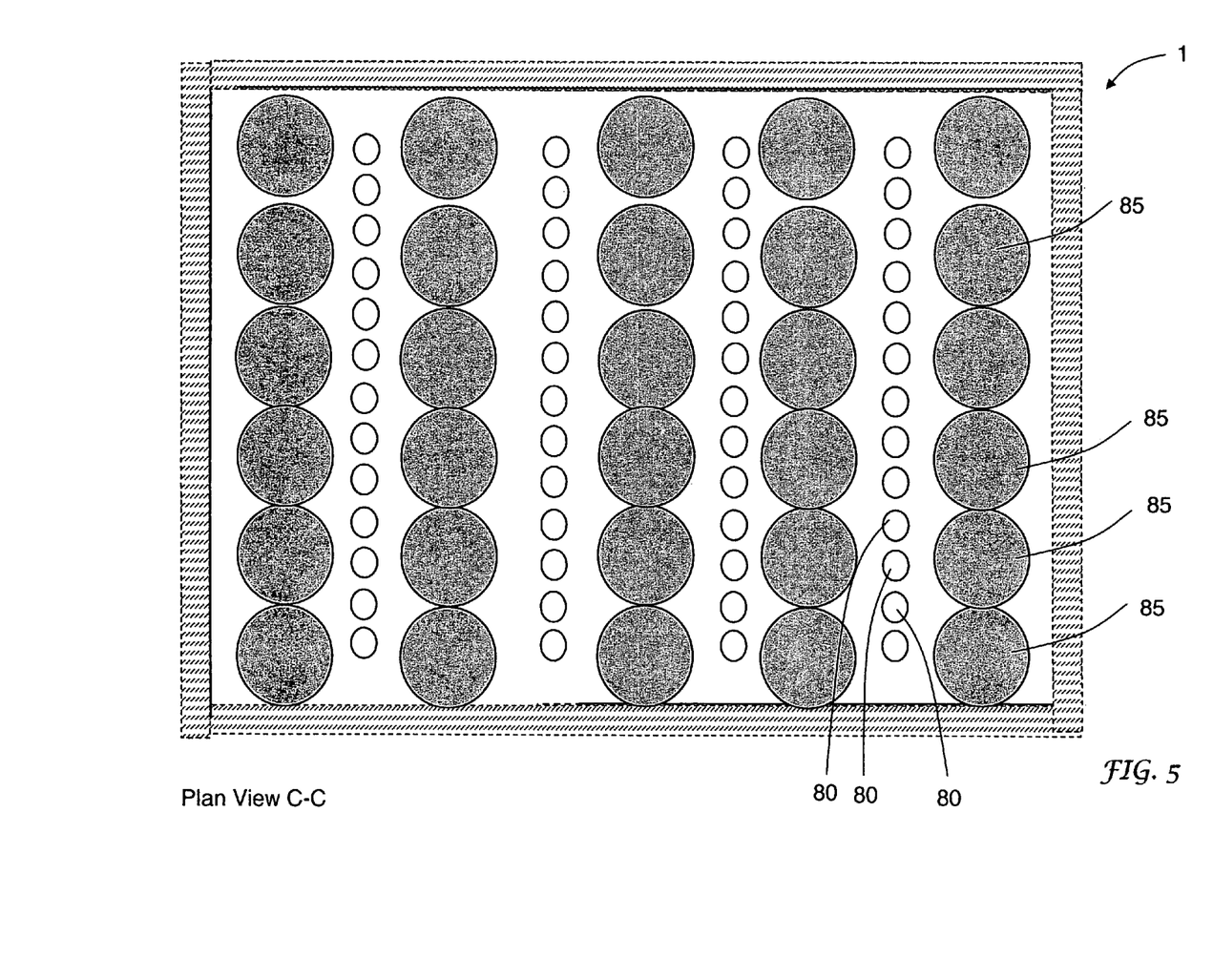
FIG. 5 is a schematic diagram illustrating a plan view of a furnace depicting horizontally projected turbulent free-jet areas of oxidant conduits.

As depicted in FIG. 5, each oxidant outlet 12 defines a horizontally projected turbulent free-jet area 85 at 30% of the average distance from interior end 50 to interior end 60. Added together, these horizontally projected turbulent free-jet areas 85 represent a combined horizontally projected turbulent free-jet area. The horizontally projected free-jet area relates to the cross-sectional area of the jet on a horizontal plane.

A turbulent free-jet area is a calculated value defined by $$A_{jet} = \frac{\pi}{4} D_{jet}^2, \text{ where}$$

$$D_{jet} = D_o + 2L\tan\frac{\theta}{2}.$$

$D_o$ is the diameter of the oxidant outlet 12 and typically may be anywhere between 0.203 m (8 in.) and 0.508 m (20 in.). In case the diameter of the outlet, $D_o$, is not circular, the hydraulic diameter is used. The projected area is calculated at a length, L. For the purposes of this invention disclosure, L is evaluated at 30% of the overall distance from the interior end 50 to the interior end 60, which in FIG. 3, the overall distance is effectively the exposed reaction chamber 80 length or so-called heated length. The overall distance from the interior end 50 to the interior 60 excludes protrusions, for example the tunnels 122 and/or burner tile extentions (not shown). Typically, the reaction chamber length may be anywhere from 6.1 m (20 ft) to 15.24 m (50 ft). In case the distance between the interior end 50 and interior end 60 varies, the average distance is used. θ is the turbulent free-jet spreading angle defined as the total enclosed angle by the half-velocity boundaries, where the jet axial velocity decreases to half the local maximum at the jet axis. This angle has values somewhere between 20° [Perry's Chemical Engineering Handbook, 6$^{th}$ edition, p. 5-22] and 24° [F. W. White, Viscous Fluid Flow, McGraw Hill, New York, 1974, p. 509.] For the purpose of this disclosure, θ is 22°. The turbulent free-jet area, as defined above, is based on physical geometries of the oxidant conduits and furnace.

The combined horizontally projected turbulent free-jet area is the simple sum of the individually calculated turbulent free-jet areas. No account is taken for overlap of the individual free jet areas. By this calculation method, the combined horizontally projected turbulent free-jet area may be greater than the cross-sectional area of the furnace.

Referring again to FIG. 3, the inventive method comprises introducing a fuel into a plurality of fuel conduits 21. The fuel may be any fuel known in the art for steam methane reformers and/or ethylene cracking furnaces. The fuel may comprise at least one of methane, natural gas, refinery fuel gas, PSA off gas, reformer tail gas and other light hydrocarbons. As shown in FIG. 3, at least some fuel is introduced into the furnace separately from the oxidant. This is sometimes referred to as fuel staging and can be effective for reducing NOx emissions from a furnace as described in U.S. Pat. Nos. 6,773,256 and 6,866,503, both assigned to Air Products and Chemicals, Inc.

Multiple fuel conduits 21 may be associated with a single oxidant conduit 11. Fuel conduits 21 have outlets 22 fluidly communicating with the interior of the furnace 1, wherein the outlets 22 are proximate the interior end 50 of furnace 1. Fuel conduit outlets 22 may be flush with interior end 50 or fuel conduits 21 may extend into the furnace such that outlets 22 are downstream of oxidant outlets 12. Fuel conduits 21 may have like geometry or differing geometries. Fuel outlets 22 may have like cross-sectional areas or differing cross-sectional areas. Fuel outlets 22 may have specialized cross-sections as described in U.S. Pat. No. 6,866,503.

Fuel from the plurality of fuel conduits 21 and oxidant from the plurality of oxidant conduits 11 are mixed in the interior of the furnace and reacted thereby forming a plurality of flame portions 30. While some fuel and oxidant may be premixed and introduced through oxidant conduits 11, at least some fuel and oxidant is mixed in the furnace interior, thereby employing the so-called fuel staging.

Heat from the plurality of flame portions 30 is transferred to a plurality of elongated reaction chambers 80. In the case of a steam methane reformer, reaction chambers 80 are at least partially filled with reforming catalyst. In the case of an ethylene cracking furnace, reaction chambers 80 may or may not be at least partially filled with an ethylene cracking catalyst. Suitable reforming or ethylene cracking catalysts are conventional and known in the art. Reaction chambers 80 traverse the furnace from the interior end 50 to the interior end 60. Reaction chambers 80 have an end portion 81 in spaced relation to the plurality of oxidant conduits 11 and fuel conduits 21. Process gases may flow in the reaction chambers 80, cocurrent or countercurrent to the prevailing flow of combustion gases in the furnace.

Inventors have discovered that flames in furnace 1 may be deflected and/or unstable if sufficient space for circulating furnace gases is not provided, particularly for furnaces with an aspect ratio greater than 0.8. Unstable, deflected flames may disproportionately heat some reaction chambers 80 relative to other reaction chambers 80.

Generally, the width and length of interior end 50 is the same as the width and length, respectively, of the furnace. For the purposes of this disclosure the furnace aspect ratio is defined by the aspect ratio of the interior end 50. The aspect ratio of the interior end 50 (furnace aspect ratio) is the ratio of the furnace width dimension to row length dimension (furnace interior dimensions). The row length relates to the primary row direction and the width relates to the secondary row direction.

Figure 6:
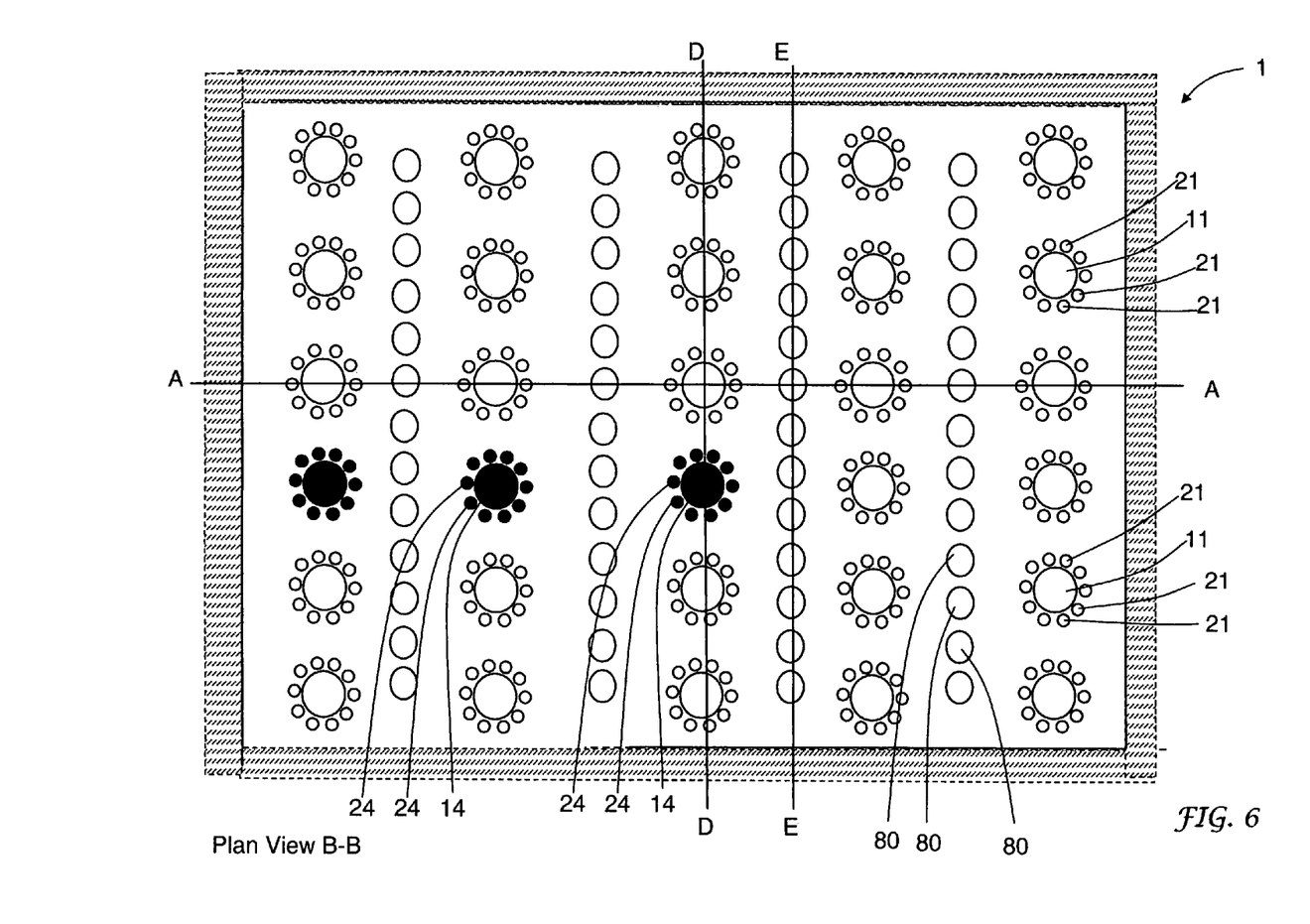
FIG. 6 is a schematic diagram illustrating a plan view of a furnace depicting unutilized oxidant conduits.

As shown in FIG. 6, oxidant conduits 11 may be aligned in primary and secondary rows. Reaction chambers 80 may also be aligned in primary and secondary rows. A primary row of reaction chambers 80 corresponds to the closely spaced row. As shown in FIG. 6, line E-E passes through a primary row of reaction chambers 80. A primary row of oxidant conduits 11 is aligned parallel, within construction tolerances, to the primary rows of reaction chambers 80. For example, line D-D passes through a primary row of oxidant conduits 11. A secondary row is aligned perpendicular, within construction tolerances, to the primary rows of reaction chambers 80. For example, line A-A passes through a secondary row of oxidant conduits.

Observations relating to conventional burner installations and low NOx burner installation projects are summarized in Table I. Four different furnaces are represented in the table. Cases 1 and 2 are the same furnace. The normalized reaction chamber length is the reaction chamber length normalized with the reaction chamber length of the furnace of case 1. Cases 1, 2, and 5 relate to furnaces having larger furnace aspect ratios, which are greater than 0.8, while cases 3 and 4 relate to furnaces having smaller furnace aspect ratios, which are less than 0.8. Cases 1 through 4 relate to furnaces having fuel staging, while case 5 relates to a furnace which does not have fuel staging. The "Area Ratio at 30%" in Table 1 is the calculated value of the combined horizontally projected turbulent free-jet area at 30% of the average distance from the first interior end of the furnace to the second interior end of the furnace divided by the horizontally projected area of the interior end 50.

Results for cases 3 and 4 suggest that the area ratio at 30% may not be so important for furnaces with aspect ratios less than 0.8, since no flame impingement on reaction chambers was observed for area ratios of 127% and 130%.

Results for case 5 suggest that the area ratio at 30% may not be so important for furnaces without fuel staged burners where the furnace aspect ratio is greater than 0.8, since no flame impingement on reaction chambers was observed for an area ratio of 128%.

However, cases 1 and 2 illustrate an important finding. Cases 1 and 2 relate to a furnace having a furnace aspect ratio greater than 0.8 and employing burners with fuel staging. In case 1, where the area ratio at 30% was 108%, flame impingement on the reaction chambers was observed, whereas for case 2 where the area ratio at 30% was 104%, no flame impingement on the reaction chambers was observed.

Case 2 differs from case 1 because of a reduced area ratio at 30% as a result of five unutilized oxidant conduits (described further below). Fuel conduits associated with the unutilized oxidant conduits were also unutilized.

These results suggest that for a furnace having an aspect ratio greater than 0.8 and burners with fuel staging, flame impingement on reaction chambers 80 may be avoided if the area ratio at 30% is about 104% or less.

TABLE I

| | Case | | | | |
|---|---|---|---|---|---|
| | 1 | 2 | 3 | 4 | 5 |
| Oxidant Outlet Diameter (m) | 0.318 | 0.318 | 0.305 | 0.363 | 0.426 |
| Normalized Reaction Chamber Length | 1 | 1 | 0.79 | 0.97 | 1.03 |
| Furnace Aspect Ratio (Width to Row Length) | 1.3 | 1.3 | 0.3 | 0.6 | 1.3 |
| Fuel Staging | Yes | Yes | Yes | Yes | No |
| Area Ratio at 30% | 108% | 104% | 127% | 130% | 128% |
| Flame Impingement on Reaction Chambers | Yes | No | No | No | No |

According to an embodiment of the invention, the combined horizontally projected turbulent free-jet area at 30% of the average distance from the interior end 50 to the interior end 60 is reduced to between 10% and 105% of the horizontally projected area of the interior end 50. The combined horizontally projected turbulent free-jet area at 30% of the average distance from the interior end 50 to the interior end 60 may be reduced to between 90% and 105%, or between 90% and 104% of the horizontally projected area of the interior end 50.

By reducing the horizontally projected turbulent free-jet area at 30% of the average distance from the interior end 50 to the interior end 60, sufficient space for circulating furnace gases is provided thereby straightening the flames and providing more uniform heating of the reaction chambers 80.

The horizontally projected free jet area at 30% of the average distance from the interior end 50 to the interior end 60 may be reduced by any number of means. It may be reduced by terminating the introduction of oxidant to at least one of the plurality of oxidant conduits 11. An unutilized oxidant conduit is formed when the introduction of oxidant is substantially or completely terminated. The introduction of oxidant is substantially terminated if the resulting jet of air lacks sufficient momentum to penetrate 10% of the average distance from the interior end 50 to the interior end 60. The contribution to the combined horizontally projected turbulent free-jet area is zero for an unutilized oxidant conduit. The introduction of fuel to the fuel conduits 21 associated with and/or adjacent to unutilized oxidant conduits may also be terminated.

The introduction of oxidant to multiple oxidant conduits may be terminated to reduce the combined horizontally projected turbulent free-jet area at 30% of the average distance from the interior end 50 to the interior end 60. Inventors have discovered that more favorable results can be obtained when the unutilized oxidant conduits are positioned in a common secondary row. FIG. 6 shows an example with three unutilized oxidant conduits 14 and associated unutilized fuel conduits 24. The unutilized oxidant conduits are shown positioned in a common secondary row.

Cases 1 and 2 demonstrate the positive impact of unutilized oxidant conduits. In case 2, five oxidant conduits in a secondary row were unutilized in the center of the furnace. Tube wall temperatures near the bottom of the furnace were measured for each of the reaction chambers using an optical pyrometer. The overall standard deviation for the reaction chamber wall temperatures were 51° F. and 34° F. for cases 1 and 2, respectively.

Figure 7:
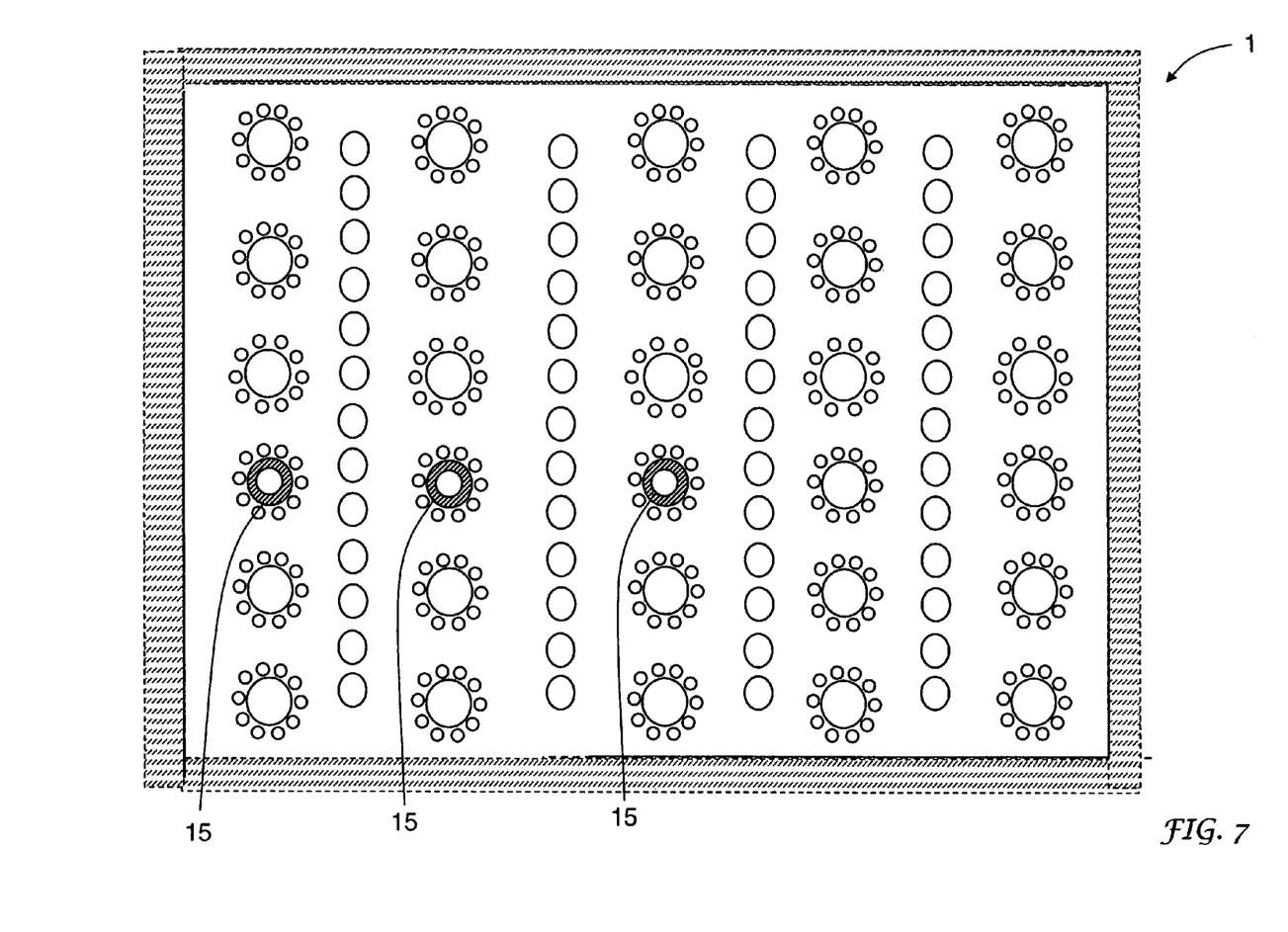
FIG. 7 is a schematic diagram illustrating a plan view of a furnace depicting means for reducing the cross-sectional area of oxidant conduit outlets.

Another means for reducing the combined horizontally projected free jet area at 30% of the average distance from the interior end 50 to the interior end 60 is to reduce the cross-sectional area of at least one of the plurality of oxidant conduit outlets. It is readily apparent from the calculation of the horizontally projected turbulent free-jet area that reduction of the cross-sectional area of oxidant conduit outlets affects the combined horizontally projected turbulent free-jet area at 30% of the average distance from the interior end 50 to the interior end 60. The oxidant outlet cross-sectional area may be reduced, for example, by adding a refractory or ceramic sleeve. The sleeve may be a tube-like part or bushing designed to fit within the oxidant conduit. FIG. 7 illustrates three oxidant conduits which have fitted sleeves 15.

Another means for reducing the combined horizontally projected free jet area at 30% of the average distance from the interior end 50 to the interior end 60 is to replace at least one of the burner tiles with a burner tile having a smaller diameter oxidant conduit outlet.

Figure 8:
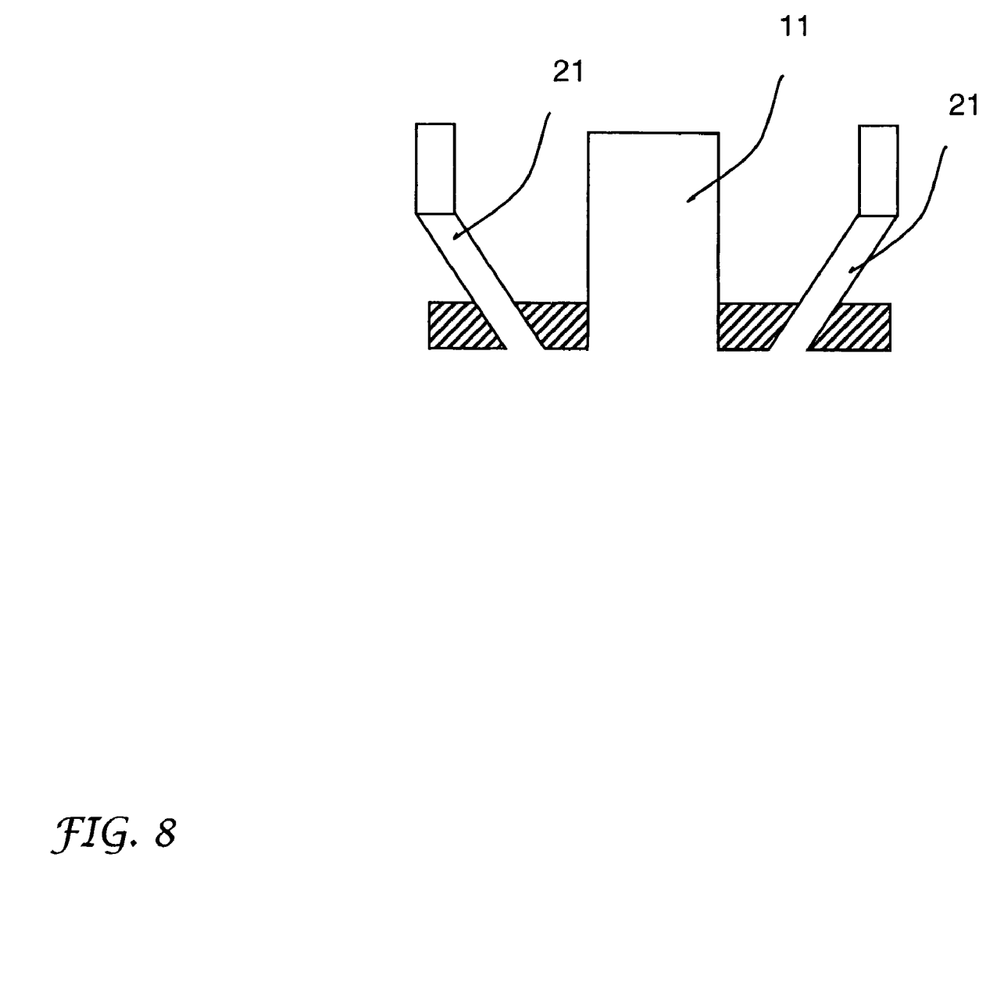
FIG. 8 is a schematic diagram illustrating fuel conduits angled towards an adjacent oxidant conduit centerline.

Inventors have also discovered that the flame straightening may be affected by the angle of introduction of the fuel. In an embodiment of the invention as illustrated in FIG. 8, the method further comprises introducing fuel from at least one of the plurality of fuel conduits 21 into the furnace at an angle towards the associated oxidant conduit 11 centerline. The angle may be 1 to 90 degrees from vertical, or 15 to 60 degrees from vertical, or 25 to 60 degrees from vertical, or 25 to 45 degrees from vertical.

Computational fluid dynamics simulations were conducted having four of ten fuel lances angled towards an associated oxidant conduit centerline. The simulations suggested that by angling introduction of the fuel, a larger combined horizontally projected area of the turbulent free-jet at 30% of the average distance from the interior end 50 to the interior end 60 may be permitted relative to the horizontally projected area of the interior end 50. Angling of the fuel toward the adjacent, associated air jet reduces the effective diameter of the oxidant conduit allowing a larger horizontally projected area of the turbulent free-jet relative to the horizontally projected area of the interior end 50.

In another embodiment of the invention, the current invention relates to a furnace for generating straightened flames in a furnace. The furnace may be constructed by means known in the art. Referring to FIG. 3, illustrating a transverse view through furnace 1, the inventive furnace comprises a plurality of oxidant conduits 11. The plurality of oxidant conduits 11 may be aligned in primary and secondary rows. Oxidant conduits 11 have outlets 12 fluidly communicating with the interior of the furnace 1, wherein the outlets 12 are proximate interior end 50 of furnace 1. As shown in FIG. 3, furnace 1 also has interior end 60 which is opposite interior end 50. The furnace 1 may have at least one inner surface connecting the interior end 50 to the interior end 60 thereby forming the furnace interior. Oxidant conduits 11 may have like geometry or differing geometries. Oxidant outlets 12 may have like cross-sectional areas or differing cross-sectional areas.

As illustrated in the plan view of furnace 1 in FIG. 4, interior end 50 has a horizontally projected area 71, represented by the rectangular shaded area. A horizontally projected area is the area projected onto a horizontal plane in a direction normal to the horizontal plane. In case the interior end 50 is not a planar surface, for example a slanted or arched surface, the surface may also be projected onto a horizontal plane to give a horizontally projected area. The interior end 50 may have an aspect ratio greater than 0.8.

As depicted in FIG. 5, each oxidant outlet 12 defines a horizontally projected turbulent free-jet area 85 at 30% of the average distance from interior end 50 to interior end 60. Added together, these horizontally projected turbulent free-jet areas 85 represent a combined horizontally projected turbulent free-jet area.

Referring again to FIG. 3, the inventive furnace comprises a plurality of fuel conduits 21. As shown in FIG. 3, the fuel conduits 21 are in spaced relation to the oxidant conduits 11. The separate fuel conduits are sometimes referred to as fuel staging lances and the technique of staging fuel can be effective for reducing NOx emissions from a furnace as mentioned above.

Multiple fuel conduits 21 may be associated with a single oxidant conduit 11. The number of fuel conduits 21 may be at least four times greater than the number of oxidant conduits 11. Or as shown in FIG. 4, the number of fuel conduits 21 may be at least 10 times greater than the number of oxidant conduits 11. Fuel conduits 21 have outlets 22 fluidly communicating with the interior of the furnace 1, wherein the outlets 22 are proximate the interior end 50 of furnace 1. Fuel conduit outlets 22 may be flush with interior end 50 or fuel conduits 21 may extend into the furnace such that outlets 22 are downstream of oxidant outlets 12. Fuel conduits 21 may have like geometry or differing geometries. Fuel outlets 22 may have like cross-sectional areas or differing cross-sectional areas. Fuel outlets 22 may have specialized cross-sections as described in U.S. Pat. No. 6,866,503.

In an embodiment of the invention as illustrated in FIG. 8, the fuel conduits 21 may be angled towards the associated oxidant conduit 11 centerline. The angle may be 1 to 90 degrees from vertical, or 15 to 60 degrees from vertical, or 25 to 60 degrees from vertical, or 25 to 45 degrees from vertical.

Oxidant conduits 11 and fuel conduits 21 may be formed in a burner tile or block, which may be a refractory material.

The furnace further comprises a plurality of reaction chambers 80. In the case of a steam methane reformer, reaction chambers 80 are at least partially filled with reforming catalyst. In the case of an ethylene cracking furnace, reaction chambers 80 may or may not be at least partially filled with ethylene cracking catalyst. Suitable reforming or ethylene cracking catalysts are conventional and known in the art. Reaction chambers 80 traverse the furnace from the interior end 50 to the interior end 60. Reaction chambers 80 have an end portion 81 in spaced relation to the plurality of oxidant conduits 11 and fuel conduits 21.

According to an embodiment of the invention, furnace 1 is provided where the combined horizontally projected turbulent free-jet area at 30% of the average distance from the interior end 50 to the interior end 60 is between 10% and 105% of the horizontally projected area of the interior end 50. The combined horizontally projected turbulent free-jet area at 30% of the average distance from the interior end 50 to the interior end 60 may be between 90% and 105%, or between 90% and 104% of the horizontally projected area of the interior end 50.

The furnace may be designed and constructed with a combined horizontally projected turbulent free-jet area at 30% of the average distance from the interior end 50 to the interior end 60 between 10% and 105%, or between 90% and 105%, or between 90% and 104% of the horizontally projected area of the interior end 50. Alternatively, the furnace may be modified to have a combined horizontally projected turbulent free-jet area at 30% of the average distance from the interior end 50 to the interior end 60 between 10% and 105%, or between 90% and 105%, or between 90% and 104% of the horizontally projected area of the interior end 50.

A modified furnace may have a means for reducing the combined horizontally projected turbulent free-jet area at 30% of the average distance from the interior end 50 to the interior end 60. The means for reducing the combined horizontally projected turbulent free-jet area may comprise at least one unutilized oxidant conduit. The means for reducing the combined horizontally projected turbulent free-jet area may comprise at least two unutilized oxidant conduits. In this case, the at least two unutilized oxidant conduits may be positioned in a common secondary row.

The means for reducing the combined horizontally projected turbulent free-jet area may comprise a means for reducing the cross-sectional area of the outlet of at least one of the plurality of oxidant conduits. The oxidant outlet cross-sectional area may be reduced, for example, by adding a refractory or ceramic sleeve. The sleeve may be a tube-like part or bushing designed to fit within the oxidant conduit. FIG. 7 illustrates three oxidant conduits which have been fitted with sleeves 15.

Another means for reducing the combined horizontally projected free jet area at 30% of the average distance from the interior end 50 to the interior end 60 is to replace at least one of the burner tiles with a burner tile having a smaller diameter oxidant conduit outlet.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

We claim:

1. A method for generating straightened flames in a furnace comprising:

introducing an oxidant into a plurality of oxidant conduits, each of the plurality of oxidant conduits formed in a burner tile or burner block and having an outlet fluidly communicating with the furnace interior proximate a first interior end of the furnace, the first interior end of the furnace having a horizontally projected area, the plurality of oxidant conduit outlets defining a combined horizontally projected turbulent free-jet area at 30% of the average distance from the first interior end of the furnace to a second interior end of the furnace, the second interior end of the furnace opposite the first interior end of the furnace;

introducing a fuel into a plurality of fuel conduits, each of the plurality of fuel conduits having an outlet fluidly communicating with the furnace interior proximate the first interior end of the furnace, the plurality of fuel conduits in spaced relation to the plurality of oxidant conduits;

mixing the fuel and the oxidant in the furnace interior;

reacting the fuel and the oxidant thereby forming a plurality of flame portions;

transferring heat from the plurality of flame portions to a plurality of reaction chambers, said plurality of reaction chambers traversing from the first interior end of the furnace to the second interior end of the furnace, said plurality of reaction chambers having an end portion in spaced relation to the plurality of oxidant conduits and in spaced relation to the plurality of fuel conduits; and reducing the combined horizontally projected turbulent free-jet area at 30% of the average distance from the first interior end of the furnace to the second interior end of the furnace to between 10% and 105% of the horizontally projected area of the first interior end.

2. The method of claim 1 wherein the combined horizontally projected turbulent free-jet area at 30% of the average distance from the first interior end of the furnace to the second interior end of the furnace is reduced to between 90% and 105% of the horizontally projected area of the first interior end.

3. The method of claim 1 wherein the step of reducing the combined horizontally projected turbulent free-jet area at 30% of the average distance from the first interior end of the furnace to the second interior end of the furnace comprises terminating or substantially terminating the introduction of the oxidant to at least one of the plurality of oxidant conduits.

4. The method of claim 3 further comprising terminating the introduction of fuel to a plurality of fuel conduits adjacent to the at least one of the plurality of oxidant conduits having the introduction of oxidant terminated.

5. The method of claim 1 wherein the step of reducing the combined horizontally projected turbulent free-jet area at 30% of the average distance from the first interior end of the furnace to the second interior end of the furnace comprises terminating the introduction of the oxidant to at least two of the plurality of oxidant conduits.

6. The method of claim 5 wherein the at least two of the plurality of oxidant conduits are positioned in a common secondary row.

7. The method of claim 1 wherein the step of reducing the combined horizontally projected turbulent free-jet area at 30% of the average distance from the first interior end of the furnace to the second interior end of the furnace comprises reducing the cross-sectional area of at least one of the plurality of oxidant conduit outlets.

8. The method of claim 1 further comprising introducing the oxidant from at least one of the plurality of oxidant conduits into the furnace substantially vertically downward.

9. The method of claim 1 further comprising introducing the fuel from at least one of the plurality of fuel conduits into the furnace at an angle towards an adjacent oxidant conduit centerline wherein the angle is 25 to 60 degrees from vertical.

10. A furnace comprising:
a first interior end having a horizontally projected area;
a second interior end opposite the first interior end;
a plurality of oxidant conduits proximate the first interior end, each of the plurality of oxidant conduits formed in a burner tile or burner block and having an outlet fluidly communicating with the furnace interior, said plurality of oxidant conduit outlets defining a combined horizontally projected turbulent free-jet area at 30% of the average distance from the first interior end to the second interior end;
a plurality of fuel conduits proximate the first interior end, each of the plurality of fuel conduits having an outlet fluidly communicating with the furnace interior, said plurality of fuel conduits in spaced relation to the plurality of oxidant conduits; and
a plurality of elongated reaction chambers traversing from the first interior end to the second interior end, having an end portion in spaced relation to the plurality of oxidant conduits and in spaced relation to the plurality of fuel conduits;
wherein the combined horizontally projected turbulent free-jet area at 30% of the average distance from the first interior end to the second interior end is between 10% and 105% of the horizontally projected area of the first interior end.

11. The furnace of claim 10 wherein the combined horizontally projected turbulent free-jet area at 30% of the average distance from the first interior end to the second interior end is between 90% and 105% of the horizontally projected area of the first interior end.

12. The furnace of claim 10 wherein the first interior end has an aspect ratio greater than 0.8.

13. The furnace of claim 10 wherein the number of fuel conduits is at least 4 times greater than the number of oxidant conduits.

14. The furnace of claim 10 further comprising a means for reducing the combined horizontally projected free jet area at 30% of the average distance from the first interior end to the second interior end.

15. The furnace of claim 14 wherein the means for reducing the combined horizontally projected free jet area at 30% of the average distance from the first interior end to the second interior end comprises a means for reducing the cross-sectional area of the outlet of at least one of the plurality of oxidant conduits.

16. The furnace of claim 10 further comprising at least one unutilized oxidant conduit.

17. The furnace of claim 10 further comprising at least two unutilized oxidant conduits.

18. The furnace of claim 17 wherein the at least two unutilized oxidant conduits are positioned in a common secondary row.

19. The furnace of claim 10 wherein at least one of the plurality of fuel conduits is angled towards an adjacent oxidant conduit centerline, wherein the angle is 25 to 60 degrees from vertical.

20. A furnace comprising:
a first interior end having a horizontally projected area and having an aspect ratio greater than 0.8;
a second interior end opposite the first interior end;
a plurality of oxidant conduits proximate the first interior end, each of the plurality of oxidant conduits formed in a burner tile or burner block and having an outlet fluidly communicating with the furnace interior, said plurality of oxidant conduit outlets defining a combined horizontally projected turbulent free-jet area at 30% of the average distance from the first interior end to the second interior end;
a plurality of fuel conduits proximate the first interior end, each of the plurality of fuel conduits having an outlet fluidly communicating with the furnace interior, said plurality of fuel conduits in spaced relation to the plurality of oxidant conduits; and
a plurality of elongated reaction chambers traversing from the first interior end to the second interior end, having an end portion in spaced relation to the plurality of oxidant conduits and in spaced relation to the plurality of fuel conduits;

wherein the combined horizontally projected turbulent free-jet area at 30% of the average distance from the first interior end to the second interior end is between 90% and 104% of the horizontally projected area of the first interior end.

* * * * *